Patented Jan. 5, 1937

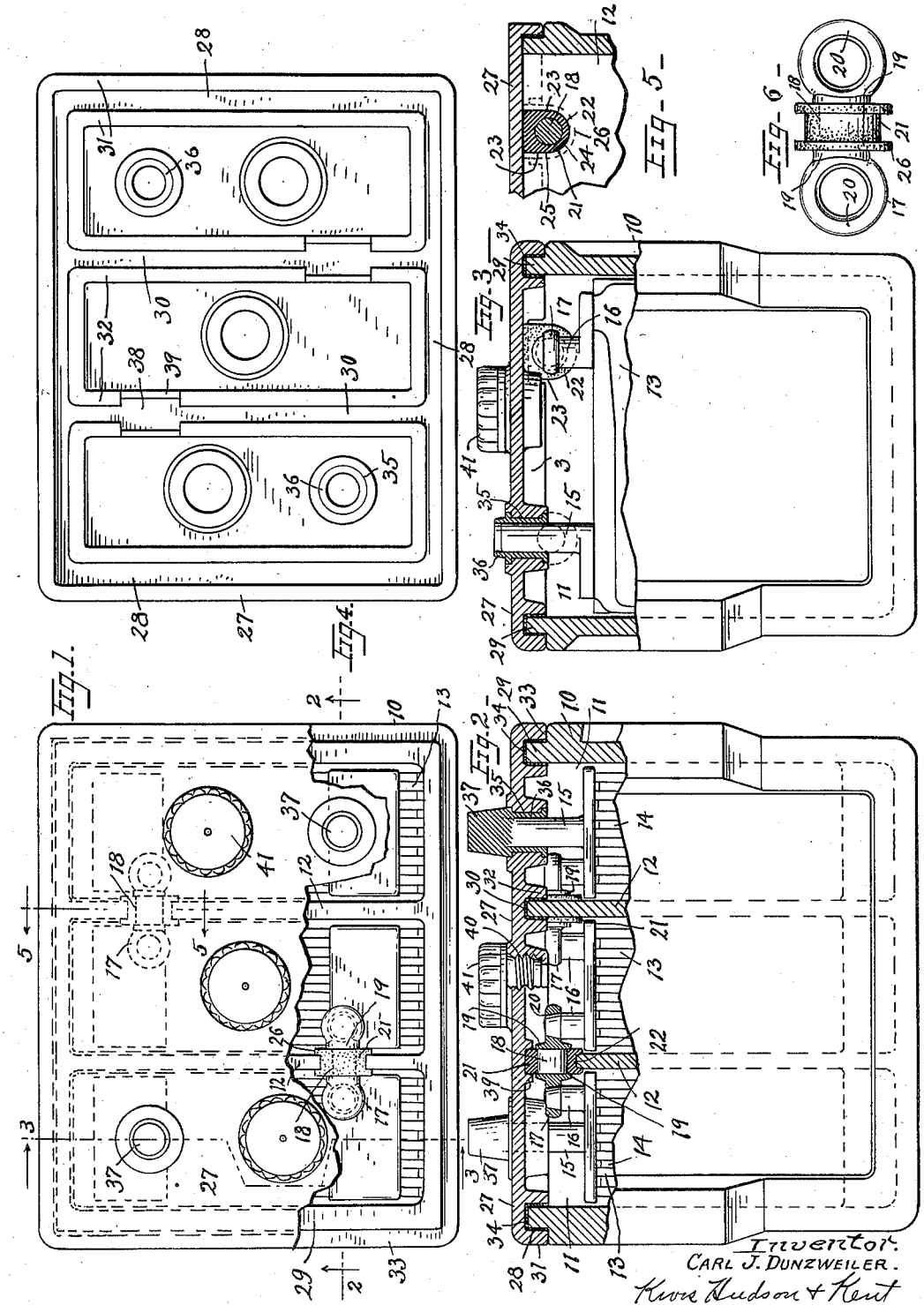

2,066,675

UNITED STATES PATENT OFFICE 2,066,675

STORAGE BATTERY

Carl J. Dunzweiler, Cleveland, Ohio, assignor to Willard Storage Battery Company, Cleveland, Ohio, a corporation of West Virginia Application January 14, 1932, Serial No. 586,524
Renewed December 3, 1935

7 Claims. (Cl. 136—134)

This invention relates to storage batteries and, as its principal object, aims to provide an improved construction for such devices.

Another object of my invention is to provide a novel and improved construction for storage batteries of a type having a conductor extending through a partition wall thereof.

A further object of my invention is to provide a multiple cell storage battery having an improved form of unitary cover.

My invention may be further briefly summarized as consisting in certain novel combinations and arrangements of parts, hereinafter described, and particularly set out in the appended claims.

In the accompanying drawing,

Figure 1 is a top plan view, with parts broken away, showing a storage battery constructed according to my invention;

Fig. 2 is a longitudinal sectional elevation thereof, taken substantially on line 2—2 of Fig. 1;

Fig. 3 is a transverse sectional elevation taken substantially on line 3—3 of Fig. 1;

Fig. 4 is a bottom plan view of the container cover;

Fig. 5 is a sectional view taken on line 5—5 of Fig. 1; and

Fig. 6 is a detached view showing the inter-cell connecting means.

For a more comprehensive description of my invention, detailed reference will now be made to the accompanying drawing wherein one form of my improved storage battery has been illustrated. Before proceeding with this detailed description, it should be understood, however, that the drawing is intended for purposes of illustration and that my invention is not to be regarded as limited to the particular battery construction shown, but may be embodied in various other forms and structural arrangements.

As illustrated in the drawing, my improved storage battery is provided with a container 10, formed of suitable material, and having the interior thereof divided into a plurality of cells or compartments 11 by the transverse partitions 12. Each of the compartments contains the customary battery elements consisting of a body of electrolyte, plate groups 13, and the usual separators 14 which are disposed between adjacent plates.

In this instance, the container 10 is shown as being provided with two transversely extending partitions, which divide the interior thereof into three compartments. The plate groups of the end compartments are provided with upwardly extending posts 15 which form a part of the main terminal posts of the battery. The plate groups of the various compartments are also provided with inter-cell connecting posts 16, which extend upwardly on opposite sides of, and adjacent to, the partition walls 12. To provide an electrical path between the connecting posts of adjacent cells, I employ an inter-cell conductor 17, which is arranged to extend through the intervening partition with its ends connected to these posts. To accommodate this inter-cell conductor, a recess is formed in the top edge of the intervening partition, and so arranged that the bottom of the recess is at an elevation above the tops of the plate groups.

The inter-cell conductor 17 is preferably constructed and arranged to extend through the partition 12 in a substantially horizontal plane, as shown in Fig. 2. This inter-cell conductor is formed with an intermediate body portion 18, which is preferably round in cross-sectional shape, and which has enlarged integrally formed flange or shoulder portions 19 thereon. This body portion is so proportioned, as to length, that the shoulders 19 thereof are spaced apart a distance which is slightly greater than the thickness of the partition. At its ends, this conductor may be provided with connecting eyes 20 into which the posts 16 extend and may be connected as by lead-burning.

As a means of sealing the recess of the partition, through which the inter-cell conductor extends, and thereby preventing the leakage of electrolyte from one cell to another, I provide a packing or bushing 21 comprising a body of non-absorbent yielding material, such as rubber. This packing is preferably separately formed, and applied to the body portion of the inter-cell conductor by stretching the same over one of the shoulder portions 19, but may also be formed by molding the rubber in place about the body portion of the conductor.

To facilitate the assembly of the conductor and packing in the recess of the partition, I form the recess with a concave or semi-circular bottom wall 22 and with substantially straight, upwardly extending side walls 23, as shown in Fig. 5 of the drawing. The body of the packing is correspondingly shaped, being provided with a convex semi-circular portion 24 which engages the concave bottom wall of the recess, and with substantially straight upwardly extending side edges 25 which engage the straight side walls 23 of the recess.

To assist in holding the packing in place and to improve the sealing action produced by the packing, I provide the latter with spaced integrally formed flanges 26 which have overlapping engagement with opposite surfaces of the partition 12 adjacent the recess therein. As clearly shown in Fig. 5 of the drawing, these integrally formed flanges are continuous and extend downwardly along the straight edges 25 of the body of the packing and around the convex lower portion 24, so as to form continuous flaps which overlie the edges of the recess and engage the surface of the partition when the bushing is in assembled position.

It should be noted, at this point in the description, that when in assembled position, the packing completely fills the recess so that the top of the packing is substantially flush with the top edge of the partition. In some instances it may be desirable to form the packing so that in its free state it is slightly larger than the recess, and at assembly must be compressed into the latter. This initial compression of the packing at assembly, improves the sealing action produced by the latter, since throughout the life of the battery the tendency for the packing to expand keeps this material in fluid-tight engagement with surface portions of the inter-cell conductor as well as with surface portions of the cover and partition.

For closing the compartments of the battery, I provide a unitary cover 27, which is preferably provided with a substantially flat upper surface, and which may be constructed of any suitable material. I construct this cover with a continuous marginal groove 28 in the under surface thereof, which groove receives and accommodates a continuous upstanding flange 29 provided around the top edge of the container 10. The cover is also provided on the under surface thereof with transverse grooves 30, which are located intermediate the ends of the cover to correspond with the spacing of the partitions 12, and which receive the tops of the latter when the cover is applied to the container. In forming the cover, which may be produced by a suitable molding operation, the grooves 28 and 30 are formed or defined, respectively, by the depending pairs of marginal flanges 31 and 32. If desired, the wall of the container 10 may be provided with a marginal shoulder 33, which is disposed outwardly of the upstanding flange 29, and which is engaged by the outer flange 31 of the cover when the latter is assembled in position.

Leakage of electrolyte over the upstanding flange 29, and over the tops of the partitions 12, may be prevented by employing a suitable sealing material 34 in the grooves 28 and 30. As this sealing material, I prefer to employ a cementitious substance so that in addition to its function of performing a seal for the electrolyte, it will also serve to hold the cover in assembled relation with the container. By employing cementitious sealing material for connecting the cover to the container, it is not necessary to utilize the posts 15 and the weight of the plate groups as the primary cover retaining means, with the result that there is little strain placed upon these posts by the cover and, accordingly, the plate groups are not likely to be displaced during use or handling of the battery.

To accommodate the posts 15, the cover is provided with suitably located openings 35, having metal sleeves or inserts 36 therein into which these posts project. These sleeves are formed of lead, and are preferably positioned in the openings of the cover by being molded in place when the cover is being formed. The posts 15 are preferably so proportioned, as to length, that they extend almost to the top of the sleeves 36 as indicated in Fig. 3. To form the usual, tapered main external terminals or posts 37, a body of lead is integrally united to each of the sleeves 36, and to the post 15 extending thereinto, by a lead-burning operation. During this operation the fused lead is molded so as to give the terminal posts 37 the desired shape, as illustrated in Fig. 2.

When the cover is applied to the container, the top portion of the partition 12 and the top portion of the packing 21 enters the cover groove 30. Since the packings are of somewhat greater thickness than the partitions in which they are mounted, it is necessary to provide the notches or enlargements 38 in the grooves 30 to accommodate the packings. Likewise, at this point of the cover, the flanges 32 are of reduced depth, as indicated at 39 in Fig. 2, to avoid interference with the inter-cell conductor.

In assembling the various parts of my battery, the plate groups are first inserted into the compartments of the battery container, with the connecting posts 16 extending upwardly on opposite sides of, and adjacent to, the partitions 12. The inter-cell conductors 17, with the packings 21 thereon, are then inserted in the recess of the partitions, and are pressed downwardly so that the edges of the packing tightly engage the correspondingly shaped walls of the recesses with the integral flanges 26 overlapping surface portions of the partition, and to bring the rings 20 into surrounding relation with the upper ends of the posts 16. The compressing of the packings in their respective recesses by the downward pressure of the cover also causes the packings to expand in the direction of the axis of the inter-cell conductors, thereby pressing the packings against the flange portions 19 of the inter-cell conductors and forming a seal which prevents electrolyte from creeping along between the packings and the surface of the conductors. After the inter-cell conductors have been positioned in this manner, the rings 20 are connected to the posts 16 by a lead burning operation. The container cover is then laid upon a suitable support in inverted position, as shown in Fig. 4, and the cementitious sealing material is poured into the grooves 28 and 30. The battery container, having the plate groups mounted in the compartments thereof, is then inverted and applied to the cover with the posts 15 extending into the sleeves 36, and the upstanding flange 29 and the tops of the partitions 12 extending, respectively, into the grooves 28 and 30 of the cover. The weight of the container and plate groups therein, and additional pressure if necessary, causes the cementitious sealing material to distribute itself around the portions of the flange 29 and partitions 12, which project into the grooves, substantially as shown in Fig. 2. After the cover has been applied in this manner the assembly is inverted and by the lead-burning operation referred to above the posts 15 are united to the sleeves 36 and external terminal posts 37 of the desired shape are formed.

A suitable vent and filling opening 40 may be provided through the cover for each cell or compartment of the container. These openings may be closed by threaded vent plugs 41 of the usual form.

It will now be readily seen that I have provided a novel and improved battery construction wherein the inter-cell conductors are arranged to extend through the cell partitions, and wherein these conductors are so constructed and formed that they can be readily assembled in such manner as to prevent leakage of electrolyte through the openings of the partitions. It will also be seen that I have provided an improved form of unitary battery cover which conceals the intercell conductors, and which is connected to the container in such a manner as to prevent leakage of electrolyte.

While I have illustrated and described the device of my invention in a detailed manner, it should be understood, however, that I do not intend to limit myself to the precise details of construction and arrangement of parts illustrated and described, but regard my invention as including such changes and modifications as do not involve a departure from the spirit of the invention and the scope of the appended claims.

Having thus described my invention, I claim:

1. A storage battery comprising a container having a partition dividing the interior thereof into compartments, said partition having a recess in the top edge thereof formed with an arcuate bottom and with substantially straight sides extending upwardly therefrom to the top edge of the partition, battery elements in said compartments including plate groups provided with posts extending upwardly adjacent said recess, a conductor extending through said recess and connecting said posts, and a bushing of yieldable material surrounding said conductor, said bushing having an arcuate bottom and substantially straight sides engaging the aforementioned correspondingly shaped portions of said recess and integral flanges engaging opposite sides of said partition adjacent the recess therein and for the full depth of the said recess.

2. A storage battery comprising a container having a partition dividing the interior thereof into compartments, said partition having a recess in the top edge thereof, battery elements in said compartments including plate groups provided with posts extending upwardly adjacent said recess, a substantially flat unitary cover on said container, said cover having a groove in the under side thereof arranged to receive the top of said partition, a body of yieldable material disposed in said recess, and a conductor connecting said posts and extending through said body and having axially spaced integral flanges disposed on opposite sides of said body, said conductor and said body being below the plane of the cover and said body being subjected to a compressive action by said cover whereby said body is sealingly pressed against said flanges and the side and bottom edges of said recess.

3. A storage battery comprising a container having a partition dividing the interior thereof into compartments, said partition having a recess in the top edge thereof, battery elements in said compartments including plate groups provided with posts extending upwardly adjacent said recess, a unitary cover on said container, said cover having a flat top and a groove in its under side arranged to receive the top of said partition, a body of sealing material substantially filling said recess and having a substantially flat top surface engaging the bottom of said groove, and a conductor connecting said posts and extending through said sealing material, said cover also having a recess on its under side in communication with said groove and arranged to receive a portion of said body of sealing material, said conductor and said body of sealing material being below the plane of the cover and said body of sealing material being normally compressed in the recess of the partition by the action of said cover against the flat top surface of the body of sealing material.

4. A storage battery comprising a container having compartments and a partition therebetween, elements in said compartments having posts adjacent the partition, said partition having a notch open at the top above the elements, a conductor connecting said posts and extending through said notch, and a seal comprising a bushing of yieldable material having a body portion disposed in the notch around the conductor and compressed by the cover, said bushing having flanges engaging the partition around the notch.

5. A storage battery comprising a container having compartments and a partition therebetween provided with a recess in its upper edge, plates in said compartments with posts adjacent the partition, a conductor extending across the partition in said recess and having ends adapted to be lead-burned to said posts, a cover, and a sealing member of yieldable material surrounding said conductor and compressed into said recess by said cover.

6. A storage battery comprising a container having compartments with partitions therebetween, each partition having a recess in the upper edge thereof, plate groups in the compartments provided with posts on opposite sides of the partitions, a conductor extending across each partition in the recess thereof and having ends adapted to be lead-burned to the posts, a unitary cover for said compartments, and bushings of yieldable material surrounding the respective conductors and compressed into the partition recesses by said cover.

7. A storage battery comprising a container having compartments and a partition therebetween provided with a recess in its upper edge, plates in said compartments with posts adjacent the partition, a conductor extending across the partition in said recess and having ends adapted to be lead-burned to said posts, said conductor having shoulders spaced longitudinally thereof and adjacent the opposite sides of the partition, a cover, and a sealing member of yieldable material surrounding said conductor, said sealing member being compressed into said recess by said cover whereby the member sealingly engages the edges of the partition recess and said shoulders of the conductor.

CARL J. DUNZWEILER.